United States Patent
Zhaohui

(10) Patent No.: US 10,319,535 B2
(45) Date of Patent: Jun. 11, 2019

(54) HIGH VOLTAGE HIGH POWER ENERGY STORAGE DEVICES, SYSTEMS, AND ASSOCIATED METHODS

(71) Applicant: Intel Corporation, Santa Clara, CA (US)

(72) Inventor: Chen Zhaohui, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 635 days.

(21) Appl. No.: 14/039,617

(22) Filed: Sep. 27, 2013

(65) Prior Publication Data
US 2015/0092318 A1 Apr. 2, 2015

(51) Int. Cl.
*H01G 11/26* (2013.01)
*H01G 11/30* (2013.01)
(Continued)

(52) U.S. Cl.
CPC ............. *H01G 11/04* (2013.01); *H01G 11/28* (2013.01); *H01G 11/46* (2013.01); *H01G 11/70* (2013.01);
(Continued)

(58) Field of Classification Search
CPC ...... H01G 11/26; H01G 9/155; H01G 9/0425; H01G 11/30; H01G 11/86; H01G 9/042; H01G 11/24
(Continued)

(56) References Cited

U.S. PATENT DOCUMENTS

| 8,058,135 B2 | 11/2011 | Merker et al. |
| 2001/0022718 A1* | 9/2001 | Appelt ................ H05K 1/162 361/502 |

(Continued)

FOREIGN PATENT DOCUMENTS

| CN | 1315139 C | 5/2007 |
| CN | 1963966 A | 5/2007 |

(Continued)

OTHER PUBLICATIONS

McPherson, Joe W. et al.; "Trends in the Ulitmate Breakdown Strength of High Dielectric-Constant Materials," IEEE Transactions of Electron Devices, vol. 50, No. 8, Aug. 2003, pp. 1771-1778.

(Continued)

*Primary Examiner* — Eric W Thomas
*Assistant Examiner* — Arun Ramaswamy
(74) *Attorney, Agent, or Firm* — Thorpe North and Western, LLP; David W. Osborne

(57) ABSTRACT

A high power density energy storage device having enhanced operation voltage is provided. Such a device can include a cathode having a structured surface on a conductive substrate, an anode positioned adjacent to the cathode, where the anode includes a silicon substrate having a structured surface, and wherein the structured surface of the cathode is oriented toward the structured surface of the anode. The device can further include a dielectric material applied to the structured surface of the anode, a conductive material or a pseudocapacitive material applied to the structured surface of the cathode, and an electrolyte disposed between the cathode and the anode.

29 Claims, 3 Drawing Sheets

(51) Int. Cl.
*H01G 11/24* (2013.01)
*H01G 11/86* (2013.01)
*H01G 9/042* (2006.01)
*H01G 11/04* (2013.01)
*H01G 11/28* (2013.01)
*H01G 11/46* (2013.01)
*H01G 11/70* (2013.01)
*H01G 11/68* (2013.01)

(52) U.S. Cl.
CPC .............. *H01G 11/68* (2013.01); *Y02E 60/13* (2013.01); *Y10T 29/417* (2015.01)

(58) Field of Classification Search
USPC .......................................... 361/502, 503, 516
See application file for complete search history.

(56) References Cited

U.S. PATENT DOCUMENTS

| | | | |
|---|---|---|---|
| 2002/0176221 A1* | 11/2002 | Hudis | H01G 9/035 361/511 |
| 2007/0211412 A1* | 9/2007 | Fife | H01G 9/0425 361/516 |
| 2007/0212538 A1 | 9/2007 | Niu | |
| 2010/0008021 A1 | 1/2010 | Hu et al. | |
| 2010/0216023 A1 | 8/2010 | Wei et al. | |
| 2011/0002088 A1 | 1/2011 | Aoyama et al. | |
| 2011/0170236 A1 | 7/2011 | Young | |
| 2012/0069492 A1* | 3/2012 | Biler | H01G 9/0425 361/517 |
| 2012/0176727 A1* | 7/2012 | Ishimoto | H01G 9/0032 361/500 |
| 2012/0300368 A1 | 11/2012 | Matsuura et al. | |
| 2013/0059174 A1 | 3/2013 | Zhamu | |
| 2014/0185260 A1 | 7/2014 | Chen et al. | |

FOREIGN PATENT DOCUMENTS

| | | | | |
|---|---|---|---|---|
| CN | 101531359 A | | 9/2009 | |
| CN | 102652183 A | | 8/2012 | |
| CN | 102918614 A | | 2/2013 | |
| JP | 05074659 A | * | 3/1993 | |
| JP | 2010287865 A | | 12/2010 | |
| JP | WO 2012115050 A1 | * | 8/2012 | H01G 11/32 |
| WO | WO 2011/123135 | | 10/2011 | |
| WO | WO 2011/136028 A1 | | 11/2011 | |
| WO | WO 2013/095466 A1 | | 6/2013 | |
| WO | WO 2013095466 A1 | * | 6/2013 | H01G 11/56 |

OTHER PUBLICATIONS

Sathiya, M., et al., $V_2O_5$-Anchored Carbon Nanotubes for Enhanced Electrochemical Energy Storage, Sep. 2, 2011, American Chemical Society, pp. 16291-16299.

KASAP; "Chapter 7: Dielectric Materials and Insulation"; Principles of Electronic Materials and Devices; (Jul. 31, 2009); pp. 514-520; 3$^{rd}$ Edition [non-English]; (KASAP; "Chapter 7: Dielectric Materials and Insulation"; Principles of Electronic Materials and Devices; (2006); pp. 628-637; Third Edition); [English translation].

* cited by examiner

HIGH VOLTAGE HIGH POWER ENERGY STORAGE DEVICES, SYSTEMS, AND ASSOCIATED METHODS

BACKGROUND

Emerging systems that benefit from an energy storage capacity with high voltage and high power capabilities often utilize capacitor-type devices such as conventional electrochemical capacitors or capacitors having a hybrid form based on electrolytic devices. Capacitors can be widely used for applications ranging from electrical circuitry and power delivery to voltage regulation and battery replacement. The total energy that a capacitive device can store can be determined by the useful surface area of the device, the distance of the spacing and its permittivity between the accumulated charges, and the square of the voltage of the space.

As capacitor technology has continued to develop, several types have emerged. As one example, electric double-layer capacitors (EDLCs), also referred to as ultracapacitors, are characterized by high energy storage and power density, small size, and low weight and have thus become promising candidates for use in several applications. Conventional EDLCs, however, tend to have substantially limited applicable voltage of just a few volts. On the other hand, conventional electrolytic capacitors operate at high voltage (up to hundreds volts) but with limited surface areas resulting in lower energy capacity.

DESCRIPTION OF EMBODIMENTS

Figure 1:
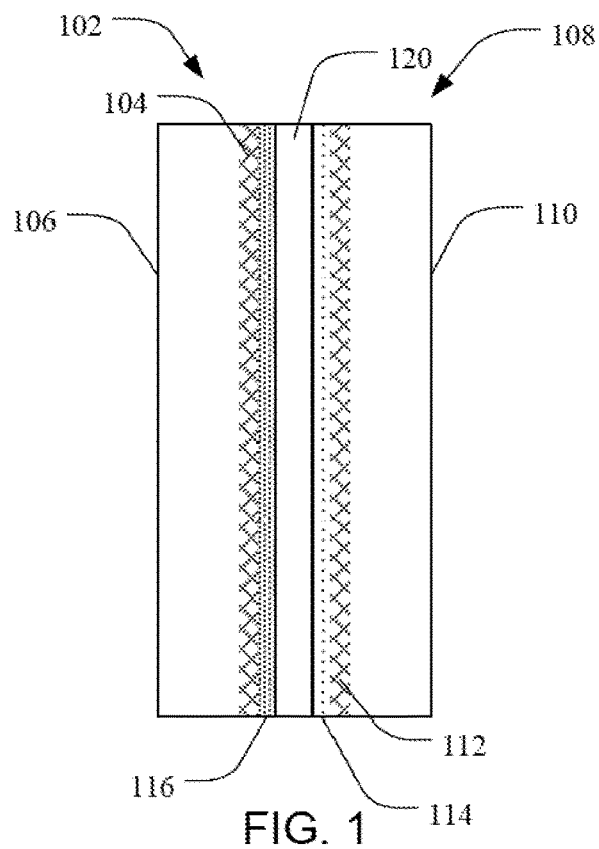
FIG. 1 is a schematic view of a section of an energy storage device in accordance with an invention embodiment.

Although the following detailed description contains many specifics for the purposes of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential features of the technology, nor is it intended to limit the scope of the claimed subject matter.

The voltage range and the energy capacity of an electric double-layer capacitor (EDLC) can be increased by incorporating a high-k high breakdown dielectric layer on the anode side, thereby introducing another high voltage capacitor in series with the double layers of the capacitor. In one aspect, for example, an electrolytic-like capacitor can be formed by applying a dielectric layer to a structured surface of a substrate such as silicon, and thus have a large surface area that is comparable to conventional EDLC. Such a structured surface can have surface features in the—nano to—micro range. The overall device voltage can be determined by the thickness of the selected dielectric layer (on anode side), which is related to the breakdown voltage for the dielectric layer. Unlike a metal-insulator-metal (MIM) capacitor, the dielectric stress is more uniform and can withstand higher field strengths because the capacitor electrolyte continues the healing work of the originally formed electrode, repairing and thickening the dielectric locally as required. This healing process is driven by the capacitor's dc leakage current at pin holes and other defects in the dielectric layer, which is drawn whenever a dc voltage is applied to the capacitor; that is, whenever the capacitor is in operation. Even for very thin dielectric materials deposited on a porous structure, the breakdown voltage is higher than it is for a corresponding MIM structure with a similar dielectric layer and relevant thickness. This is mainly due to the fact that, unlike MIM, there are no actual electron charges accumulated on either side. This effectively eliminates at least a substantial portion of tunneling electrons, and thus improves (i.e. raises the threshold of) the onset of dielectric breakdown voltage as well.

Thus, by selecting appropriate materials having dielectric constant values greater than the electrolyte, the overall device operation voltage and energy storage capacity can be improved, in some cases by at least 33% compared to a conventional porous silicon electrochemical capacitor using the same pore structure and the same conductive coating thickness for both the anode and the cathode. The higher voltage can be achieved by further increasing the dielectric thickness; however, the energy capacity may not improve simultaneously due to the decrease of the overall capacitance as a result of lower useful surface area associated with larger micro silicon structures required for thick film deposition. To further clarify, the increase in operation voltage is likely due to the fact that a majority of the voltage drop is across the dielectric layer, allowing the total voltage of the device to be higher than the electrochemical window of the electrolyte. The energy stored according to this design can be orders of magnitude greater than many widely employed conventional electrolytic capacitor used for high voltage high power operations.

Figure 2:
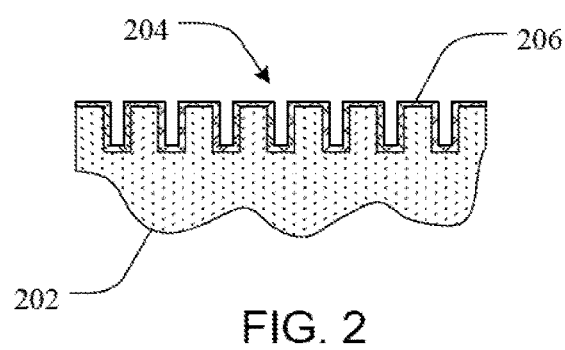
FIG. 2 is a schematic view of a section of a structured surface of a silicon substrate in accordance with an invention embodiment.

Accordingly, in one embodiment as is shown in FIG. 1, a high power density energy storage device having enhanced operation voltage is provided. Such a device can include a cathode 102 having a structured surface 104 on a conductive substrate 106, and an anode 108 positioned adjacent to the cathode 102. The anode 108 includes a silicon substrate 110 having a structured surface 112, where the structured surface 112 of the anode 108 is oriented toward the structured surface 104 of the cathode 102 to form a space or area 120 therebetween. Furthermore, a dielectric material 114 is applied to the structured surface 112 of the anode 108, and a conductive material 116 (or a pseudocapacitive material) is applied to the structured surface 104 of the cathode 102. In addition, an electrolyte is disposed in the space or area 120 between the cathode 102 and the anode 108. FIG. 2 shows a close up section of an anode having a silicon substrate 202 with a structured surface 204. A dielectric material 206 is coated onto the structured surface 204 of the silicon substrate 202.

The silicon substrate materials utilized in constructing the anode can be any type of silicon or composite silicon material capable of being used in an energy storage device. For example, the silicon can be single crystal, polycrystalline, amorphous, porous, and the like. Additionally, the silicon material can be doped or undoped depending on the design of the device. Doping can be utilized to alter various properties of the silicon material, including electrical and mechanical properties. In one embodiment, the silicon material can be a porous silicon material. In another embodiment, the silicon material can be a conductive porous silicon material.

Furthermore, in some high power aspects where heat management may become an issue, a structured silicon surface can be used as a template and the silicon can act as a sacrificial layer to form a structured surface of a metal material having good thermally conductive properties. Such a metal surface thus has high surface areas for subsequent electrode fabrication. An anode can then be formed by coating the structured metal surface with a high breakdown material such as a high breakdown oxide. As one non-limiting example, elements such as Ta, Al, and/or Nb can be directly anodized onto the structured metal surface. As another example, sintering can also be used to form a dielectric layer using metal oxide particles.

A structured surface can be defined as any surface modification that increases the surface area of the material upon which such a modification is performed. In some aspects, a silicon substrate having a structured surface can have a much higher surface area as compared to a substrate lacking such surface structuring. It is noted that any type of structuring to any degree that increases the surface area of the silicon substrate is considered to be within the present scope. In some cases, a structured surface can comprise distinct surface features that increase the surface area of the material. While such surface features can be of any size that is beneficial for use in a capacitor or ultracapacitor device, in one aspect surface features can have an average size of from about 10 nm to about 100 microns. In another aspect, surface features can have an average size of from about 10 nm to about 300 nm. In yet another aspect, surface features can have an average size of from about 10 nm to about 80 nm. Non-limiting examples of surface feature types can include pillars, tubes, trenches, cones, pyramids, walls, pores, sponges, and the like, including appropriate combinations thereof. It is noted that the measurement of average size of a given surface feature can vary depending on the feature. For example, vertically oriented surface features such as pillars, tubes, cones, and pyramids can be measured from the base to pinnacle of the feature. For pores, on the other hand, average size can be measured as an average diameter of the pore, while trenches can be measured as the trench width. In some aspects, the structured material can have a pore size of from about 30 nm to about 300 nm. It is noted that the above applies for structured surfaces on materials other than silicon as well, such as, for example, the structured surface of the cathode.

Furthermore, structured surfaces can be formed by any known method, and any such method is considered to be within the present scope. Naturally, the type of surface being formed may dictate the technique utilized to form such a material. In some aspects, for example, surface structure can be formed via a technique such as anodization, MEMS processing including lithography, chemical etching, and the like, as well as other known methods. Additionally, by varying the three dimensional characteristics of the structured surface, as well as the thickness of the dielectric material, the resulting device can be optimized to achieve higher energy capacity.

The choice of materials in the design of an energy storage device can vary greatly depending on the desired parameters of the resulting device. With respect to dielectric materials, for example, any material useful in the construction of an anode should be considered to be within the present scope.

In one aspect, for example, the dielectric material can be a high-breakdown high-K oxide film. Non-limiting examples of such dielectric materials can include $SiO_2$, $Ta_2O_5$, $Nb_2O_5$, $Al_2O_3$, $TiO_2$, $HfO_2$, $HfSiO_x$, $HfAlO_x$, $VO_x$, $SrTiO_3$, $(Ba,Sr)TiO_3$, $LiNbO_3$, $Bi_2Ti_2O_3$, and the like, including appropriate combinations thereof. Additionally, in some aspects the dielectric material can be a perovskite oxide. One technique for forming these materials can include depositing a precursor material (e.g. Ta, Nb, Al, etc.) onto the structured surface and converting the precursor material into the desired oxide by any known process such as, for example, anodizing. In some aspects, the dielectric material can be applied as a coating to the structured surface. In other aspects, the dielectric material can be a particulate material. In one aspect, the thickness of the dielectric material can be from about 20 nm to about 2 microns. Additionally, it is also contemplated that post thermal treatment such as annealing can be utilized to improve the stability and physical characteristics of the dielectric material.

In one aspect, the dielectric material can include an oxide dielectric that is polar. An electrolytic capacitor made using such a dielectric material would also be polar, in contrast to traditional electrostatic capacitors. In such cases, the capacitors should be connected according to the correct polarity to function correctly.

Dielectric materials can be formed using a variety of techniques, and any known method capable of depositing such materials on a structured silicon surface is considered to be within the present scope. For example, dielectric materials can be deposited by a variety of non-limiting methods, including CVD, PVD, ALD growth, supercritical flow growth, hydrothermal growth, and the like. Additionally, dielectric particulate materials can be deposited onto structured silicon by methods such as solution casting, electrophoresis, sintering, or the like.

The cathode can be made from a number of electrically conductive materials provided that such materials are capable of use in the capacitor devices of the present disclosure. General examples of such materials can include, without limitation, conductive polymers, metals, metal alloys, metal foams, carbon-based materials, conductive semiconductors such as silicon, silicon carbide and combinations thereof. It is noted that in some cases an electrically nonconductive material can be made electrically conductive by doping or mixing with metal or other conductive particles. In other aspects, a pseudo-capacitive material (e.g. ($RuO_2$, $MnO_2$, $V_2O_5$, $NiO_x$, $CoO_x$ etc. wherein "x" is a positive integer) deposited on a conductive substrate can form an effective cathode, and can be designed to adjust and optimize the overall device voltage and capacity. In some cases, a cathode can be formed by depositing a conductive material onto a Si substrate having a structured surface using ALD ($TiN_x$, $Ti_xAl_yN_z$, $VN_x$, $NbN_x$, $MoN_x$, $TiC_x$, $ZrC_x$, $HfC_x$, $VC_x$, $NbC_x$, $TaC_x$, $WC_x$, $TiSi_x$, $NiSi_x$, $CoSi_x$, Mo, W, Pt, Ru, etc., again, where "x" is a positive integer), supercritical flow growth, electroplating (Ni, Co, Cu, Pd, Au, etc.), or any other compatible process. In some cases, silicidation can also be employed to further improve the cathode performance. It is noted that a variety of materials suitable for use as the conductive material coating in the cathode are contemplated, and any material capable of use as a cathode substrate is considered to be within the present scope. Other non-limiting examples of conductive materials can include metals, metal nitrides, metal silicides, metal carbides, metal borides, and the like, including combinations thereof. Additionally, the conductive coating can be applied to any thickness, depending on the desired design and functionality of the resulting electrode. In one aspect, however, the conductive coating can have an average thickness of from about 0.5 nm to about 25 nm thick. However, it is to be understood that in some embodiments, the thickness may be purely a measure of desired conductivity regardless of any actual thickness. Thickness need not be measured in terms of actual physical dimensions. In some aspects, the minimum thickness may be the minimum amount that produces a desired level of conductivity. In additional aspects, the determination of adequate or desired thickness may be made solely through a measure of the achieved conductivity.

In some aspects, an intermediate layer can be applied between the structured surface and the overlying material layer, namely either the dielectric material of the anode or the conductive material of the cathode. The intermediate material can be utilized in the anode, the cathode, or both the anode and the cathode. One purpose of this layer is to improve the adhesion between the structured surface and whichever overlying material is deposited thereon. The intermediate layer can also reduce diffusion during heat treatment, as well as stabilizing the interface between these materials. In addition, it is contemplated that multiple intermediate layers can be disposed therebetween. Any intermediate material that provides a useful benefit when disposed between these layers is considered to be within the present scope. Non-limiting examples of such intermediate materials can include Cr, Ti, Au, Pt, as well as relevant other oxides thereof.

Numerous suitable electrolytes are known, and can vary depending on the design and desired properties of the resulting device. The electrolyte in general can have high ionic conductivity to lower the equivalent series resistance (ESR), which can function to boost power density. In some aspects, electrolytes can be aqueous based electrolytes (e.g., H2SO4 based) with high ionic conductivity, which can enhance power performance of the device. However, it is also contemplated that aqueous, organic, ionic liquid electrolyte based approaches or co-solvent approaches can optimize the overall device performance, among other things. Non-limiting examples of electrolytes can include KOH, NaOH, and a combination thereof; organic electrolytes such as TEABF (tetraethylammonium tetrafluoroborate) dissolved in ACN (acetonitrile) or dissolved in PC (propylene carbonate); Ionic liquid electrolytes such as EMIM BF$_4$ ($C_6H_{11}F_4BN_2$), EMIM FAP ($C_{12}H_{11}F_{18}N_2P$), EMIM OTF ($C_7H_{11}F_3N_2O_3S$), MOEDEA NTF ($C_9H_{18}F_6N_2O_5S_2$), MOEMPL NTF ($C_{10}H_{18}F_6N_2O_5S_2$), as well as combinations thereof.

Figure 3:
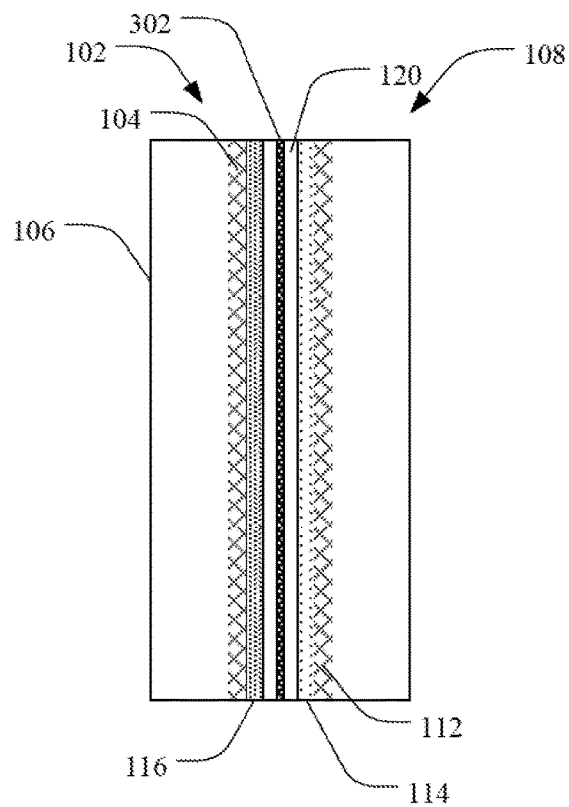
FIG. 3 is a schematic view of a section of an energy storage device in accordance with an invention embodiment.

It can be beneficial in some aspects to include a separator disposed between the cathode and the anode. The separator electronically separates or isolates the cathode from the anode and allows ions of the electrolyte to pass therethrough. As is shown in FIG. 3, for example, a separator 302 is positioned between the dielectric material 114 and the conductive or pseudocapacitive material 116, and is surrounded by electrolyte. Examples of suitable separator materials may include without limitation cellulose including wet-laid, PP non-woven, microporous membrane (ePTFE or HDPE) based materials. It is noted that reference number utilized from a previous figure are considered to be the same or similar enough to the previous figure that the previous description applies.

Figure 4:
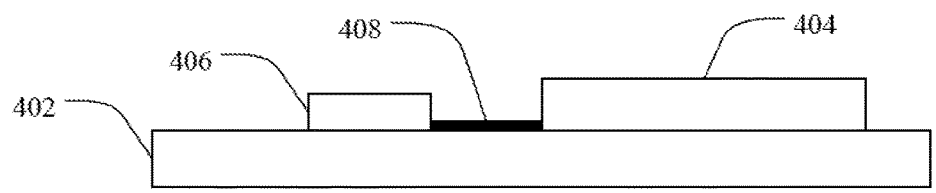
FIG. 4 is a schematic view of a monolithic device including an energy storage device in accordance with an invention embodiment.

It is further contemplated that the present devices can be incorporated into a variety of systems. For example, in another aspect an energy storage device as presently taught can be integrated monolithically onto a silicon substrate or package. As is shown in FIG. 4, for example, an electronic system having a monolithically integrated energy storage device can include a semiconductor substrate 402, at least one electronic circuit element 404, and at least one energy storage device 406. The electronic circuit element 404 and the energy storage device 406 are thus formed monolithically on the semiconductor substrate 402. The electronic circuit element can include any type of circuit element that can be beneficially combined with an energy storage device on a substrate. Non-limiting examples include CPUs, GPUs, control units, integrated circuits, transistor elements, diodes, photodiodes, and the like. Additionally, the monolithic substrate can additionally include electrical circuitry 408 that provides electrical connectivity between the energy storage device 406 and the electronic circuit element 404.

Additionally, in some aspects multiple energy storage devices can be combined to form systems having enhanced electrical properties. In one aspect, for example, a high energy storage system having enhanced operation voltage is provided. Such a system can include a plurality of high energy storage devices as have been described, where the plurality of high energy storage devices are functionally coupled together in series or in parallel depending on whether higher voltage (series) or power (parallel) is desired. In some aspects such a system can be formed by bringing together high energy storage devices that have been manufactured as separate units. In other aspects, the high energy storage devices can be formed together as a system during manufacture. It is contemplated that, in such cases, various structures can be shared between the devices being constructed in series or parallel. For example, in one aspect a pair of adjacent high energy storage devices can share a double-sided surface structured substrate, or in some cases, a composite double-sided surface structured substrate.

Figure 5:
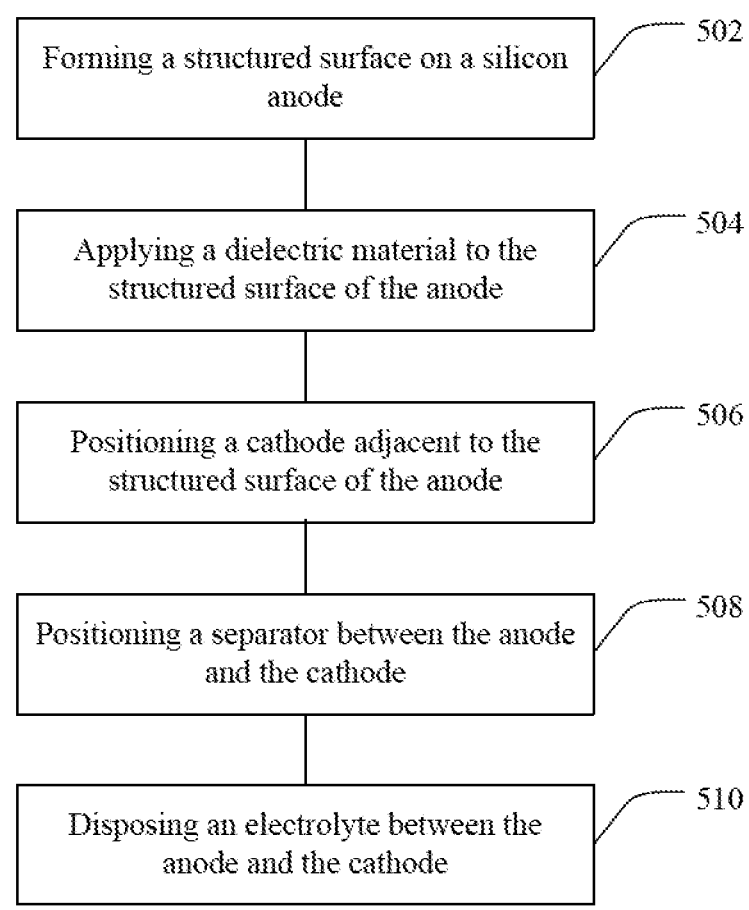
FIG. 5 is a flow diagram of a method of increasing operating voltage and energy storage capacity of an energy storage device in accordance with an invention embodiment.

The present disclosure additionally provides methods associated with the present energy storage devices. For example, in one aspect, as is shown in FIG. 5, a method of increasing operating voltage and energy storage capacity of an energy storage device is provided. Such a method can include 502 forming a structured surface on a silicon anode, 504 applying a dielectric material to the structured surface of the anode, 506 positioning a cathode adjacent to the structured surface of the anode, 508 positioning a separator between the anode and the cathode, and 510 disposing an electrolyte between the anode and the cathode.

In one example, a high power density energy storage device having enhanced operation voltage includes: 1) a cathode having a structured surface on a conductive substrate; 2) an anode positioned adjacent to the cathode, the anode including a silicon substrate having a structured surface, the structured surface of the cathode being oriented toward the structured surface of the anode; 3) a dielectric material applied to the structured surface of the anode; 4) a conductive material or a pseudocapacitive material applied to the structured surface of the cathode; and 5) an electrolyte disposed between the cathode and the anode.

In one example, a separator is disposed between the cathode and the anode to electronically separate the cathode from the anode and to allow ions of the electrolyte to pass therethrough.

In one example, at least one of the structured surface of the cathode or the structured surface of the anode has surface features of from about 10 nm to about 100 microns in size.

In one example, the surface features include a member selected from the group consisting of pillars, tubes, trenches, cones, pyramids, pores, sponges, and combinations thereof.

In on example, the anode includes a conductive silicon substrate, the conductive silicon substrate including a material selected from the group consisting of single crystal silicon, polycrystalline silicon, amorphous silicon, porous silicon, and combinations thereof.

In one example, the anode includes a conductive porous silicon substrate.

In one example, the dielectric material is a particulate material.

In one example, the dielectric material is a high-breakdown high-K oxide film.

In one example, the dielectric material includes a member selected from the group consisting of SiO2, Ta2O5, Nb2O5, Al2O3, TiO2, HfO2, HfSiOx, HfAlOx, VOx, SrTiO3, (Ba, Sr)TiO3, LiNbO3, Bi2Ti2O3, and combinations thereof.

In one example, the conductive material is selected from the group consisting of TiNx, TixAlyNz, VNx, NbNx, MoNx, TiCx, ZrCx, HfCx, VCx, NbCx, TaCx, WCx, TiSix, NiSix, CoSix, Mo, W, Pt, Ru, Ni, Co, Cu, Pd, Au, and combinations thereof.

In one example, the pseudocapacitve material is selected from the group consisting of RuO2, MnO2, V2O5, NiOx, CoOx.

In an example, the cathode includes a material selected from the group consisting of a conductive polymer, a metal foam, a carbon-based material, conductive silicon, conductive silicon carbide, and combinations thereof.

In one example, the electrolyte is either an aqueous electrolyte, an organic electrolyte, or an ionic liquid electrolyte.

In one example, an electronic system having a monolithically integrated energy storage device, can include: 1) a semiconductor substrate; 2) at least one electronic circuit element; and 3) at least one energy storage device as recited herein, wherein the at least one energy storage device and the at least one electronic circuit element are formed monolithically on the semiconductor substrate.

In one example, the electronic circuit elements include a processing unit.

In one example, the electronic circuit elements include a control unit.

In one example, a high energy storage system having enhanced operation voltage, can include a plurality high energy storage devices as recited herein functionally coupled together in series or parallel.

In one example, the plurality of high energy storage devices share at least one double-sided surface structured substrate.

In one example, a method of increasing operating voltage and energy storage capacity of an energy storage device can include: 1) forming a structured surface on a conductive silicon electrode; 2) applying a dielectric material to the structured surface of an anode; 3) positioning a cathode adjacent to the structured surface of the anode; 4) positioning a separator between the anode and the cathode; and 5) disposing an electrolyte between the anode and the cathode.

In one example, the electrolyte repairs and thickens the dielectric layer locally as required based on a leakage current of the dielectric layer during operation of the device.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. An energy storage device, comprising:
   a cathode having a structured surface on a conductive substrate;
   an anode adjacent to the cathode, the structured surface of the cathode oriented toward a surface of the anode;
   a dielectric material on the surface of the anode;
   a pseudocapacitive material coating selected from the group consisting of RuO2, MnO2, V2O5, NiOx, CoOx and combinations thereof overlying the structured surface of the cathode;
   an intermediate layer between the structured surface of the cathode and the conductive material coating or pseudocapacitive coating; and
   an electrolyte disposed between the cathode and the anode.

2. The device of claim 1, wherein the anode has a structured surface.

3. The device of claim 1, wherein the anode comprises a silicon material.

4. The device of claim 1, further comprising a separator disposed between the cathode and the anode.

5. The device of claim 1, wherein the structured surface of the cathode has surface features of from about 10 nm to about 100 microns in size.

6. The device of claim 5, wherein the surface features include a member selected from the group consisting of pillars, tubes, trenches, cones, pyramids, pores, sponges, and combinations thereof.

7. The device of claim 2, wherein the structured surface of the anode has vertically oriented pillars of from about 10 nm to about 100 microns in size.

8. The device of claim 1, wherein the anode includes a conductive silicon substrate, the conductive silicon substrate including a material selected from the group consisting of single crystal silicon, polycrystalline silicon, amorphous silicon, porous silicon, and combinations thereof.

9. The device of claim 1, wherein the anode includes a conductive porous silicon substrate.

10. The device of claim 1, wherein the dielectric material is a particulate material.

11. The device of claim 1, wherein the dielectric material is a high-breakdown high-K oxide film.

12. The device of claim 1, wherein the dielectric material includes a member selected from the group consisting of $SiO_2$, $Ta_2O_5$, $Nb_2O_5$, $Al_2O_3$, $TiO_2$, $HfO_2$, $HfSiO_x$, $HfAlO_x$, $VO_x$, $SrTiO_3$, $(Ba, Sr)TiO_3$, $LiNbO_3$, $Bi_2Ti_2O_3$, and combinations thereof.

13. The device of claim 1, wherein the conductive material coating overlies the structured surface of the cathode, and wherein the conductive material is selected from the group consisting of $TiN_x$, $Ti_xAl_yN_z$, $VN_x$, $NbN_x$, $MoN_x$, $TiC_x$, $ZrC_x$, $HfC_x$, $VC_x$, $NbC_x$, $TaC_x$, $WC_x$, $TiSi_x$, $NiSi_x$, $CoSi_x$, Mo, W, Pt, Ru, Ni, Co, Cu, Pd, Au, and combinations thereof.

14. The device of claim 1, wherein the cathode includes a material selected from the group consisting of a conductive polymer, a metal foam, a carbon-based material, conductive silicon, conductive silicon carbide, and combinations thereof.

15. The device of claim 1, wherein the electrolyte is either an aqueous electrolyte, an organic electrolyte, or an ionic liquid electrolyte.

16. An electronic system, comprising:
    a semiconductor substrate;
    at least one electronic circuit element; and
    at least one energy storage device as recited in claim 1, wherein the at least one energy storage device and the at least one electronic circuit element are monolithically integrated on the semiconductor substrate.

17. The system of claim 16, wherein the electronic circuit elements include a processing unit.

18. The system of claim 16, wherein the electronic circuit elements include a control unit.

19. The device of claim 1, wherein the intermediate layer consists of Cr, Ti, Au, Pt, or an oxide thereof.

20. An energy storage device, comprising:
a cathode having a structured surface on a conductive substrate;
an anode adjacent to the cathode, the structured surface of the cathode oriented toward a surface of the anode;
a dielectric material on the surface of the anode;
a conductive material coating having an average thickness from about 0.5 nm to about 25 nm, or a pseudocapacitive material coating overlying the structured surface of the cathode;
an intermediate layer between the structured surface of the cathode and the conductive material coating or pseudocapacitive coating; and
an electrolyte disposed between the cathode and the anode.

21. The device of claim 20, wherein the anode has a structured surface.

22. The device of claim 20, further comprising a separator disposed between the cathode and the anode.

23. The device of claim 20, wherein the structured surface of the cathode has surface features of from about 10 nm to about 100 microns in size.

24. The device of claim 23, wherein the surface features include a member selected from the group consisting of pillars, tubes, trenches, cones, pyramids, pores, sponges, and combinations thereof.

25. The device of claim 21, wherein the structured surface of the anode has vertically oriented pillars of from about 10 nm to about 100 microns in size.

26. The device of claim 20, wherein the anode includes a conductive silicon substrate, the conductive silicon substrate including a material selected from the group consisting of single crystal silicon, polycrystalline silicon, amorphous silicon, porous silicon, and combinations thereof.

27. The device of claim 20, wherein the anode includes a conductive porous silicon substrate.

28. The device of claim 20, wherein the dielectric material includes a member selected from the group consisting of $SiO_2$, $Ta_2O_5$, $Nb_2O_5$, $Al_2O_3$, $TiO_2$, $HfO_2$, $HfSiO_x$, $HfAlO_x$, $VO_x$, $SrTiO_3$, $(Ba, Sr)TiO_3$, $LiNbO_3$, $Bi_2Ti_2O_3$, and combinations thereof.

29. The device of claim 20, wherein the conductive material coating overlies the structured surface of the cathode, and wherein the conductive material is selected from the group consisting of $TiN_x$, $Ti_xAl_yN_z$, $VN_x$, $NbN_x$, $MoN_x$, $TiC_x$, $ZrC_x$, $HfC_x$, $VC_x$, $NbC_x$, $TaC_x$, $WC_x$, $TiSi_x$, $NiSi_x$, $CoSi_x$, Mo, W, Pt, Ru, Ni, Co, Cu, Pd, Au, and combinations thereof.

* * * * *